United States Patent Office 3,689,244
Patented Sept. 5, 1972

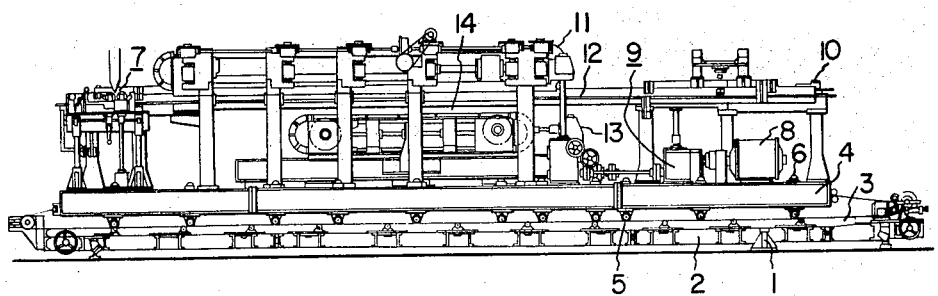
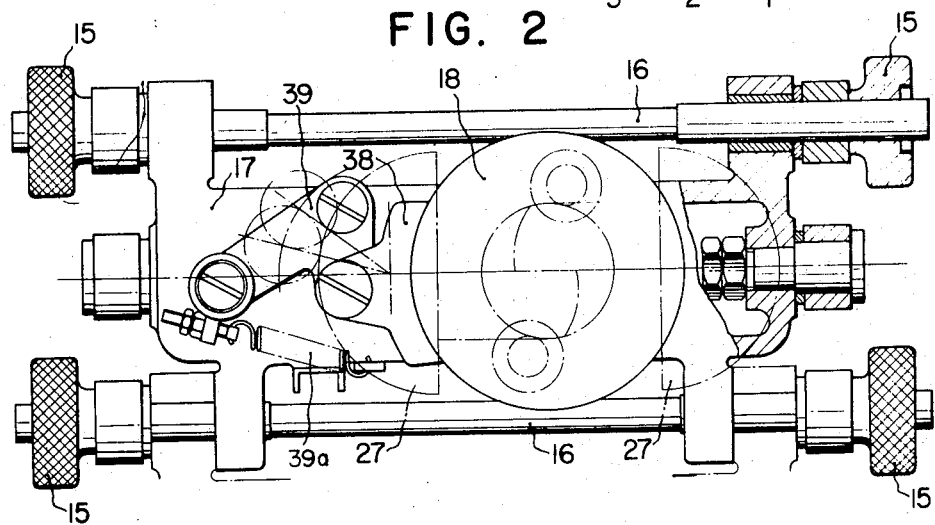

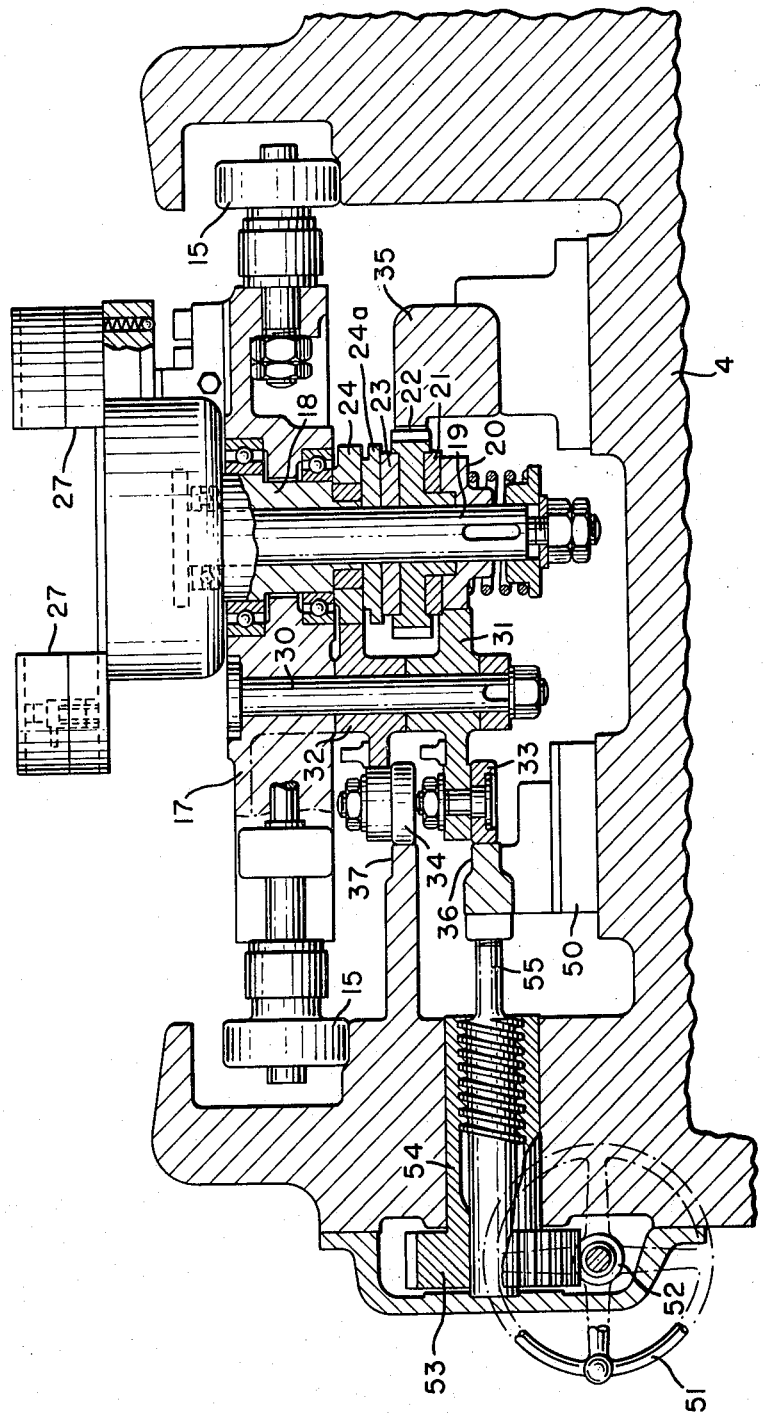

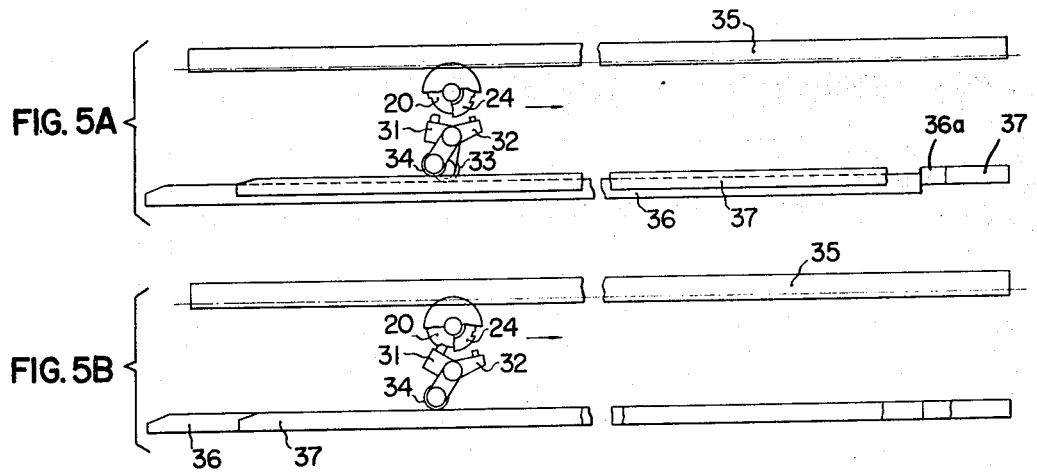
FIG. 5A
FIG. 5B
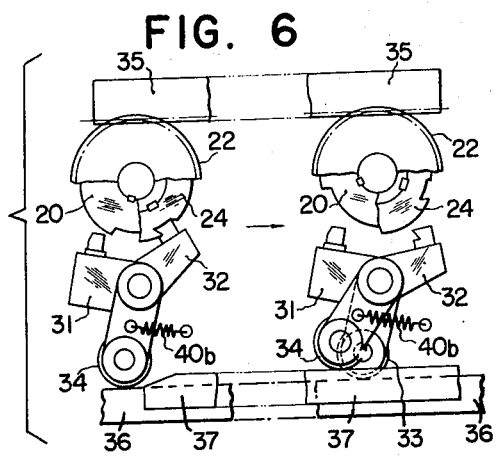
FIG. 6
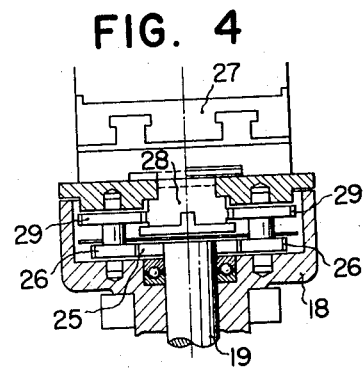
FIG. 4
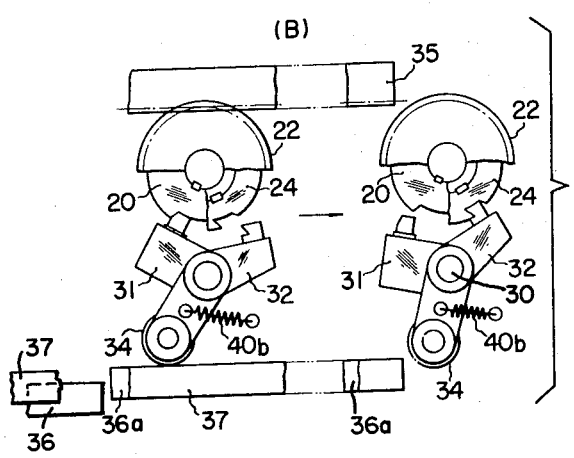
(B)
FIG. 6B

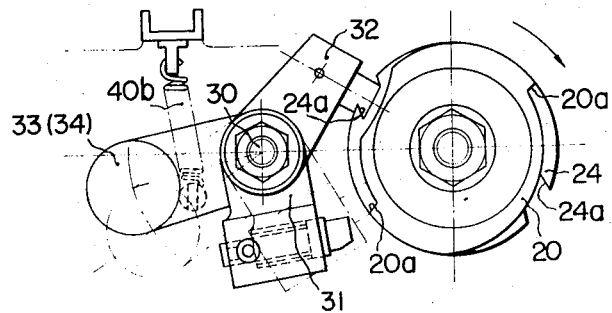
FIG. 7
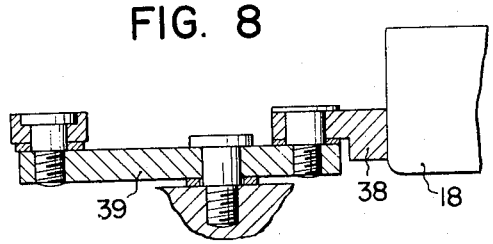
FIG. 8
FIG. 9     FIG. 10
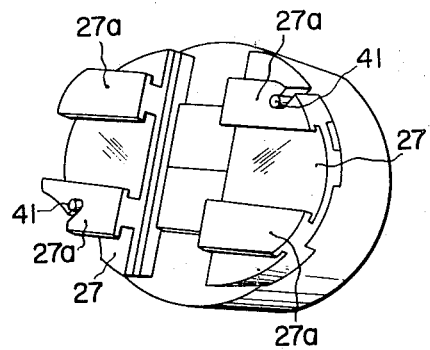 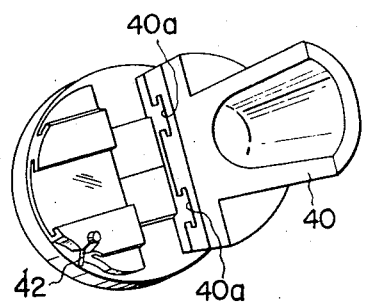

3,689,244
MOULD OPERATING MECHANISM OF A GLASS BULB MANUFACTURING MACHINE
Takaaki Kurokawa, 4154 Kowada, Kanagawa-ken, Chigasaki, Japan; Noboru Inoue, 19–17, 6-chome, Kaijin, Chiba-ken, Funabashi, Japan; and Mitsugu Fukuda, 997 Shimokodanaka, Kanagawa-ken, Kawasaki, Japan
Continuation-in-part of application Ser. No. 37,389, May 11, 1970. This application July 29, 1971, Ser. No. 167,412
Claims priority, application Japan, Sept. 26, 1966, 41/63,344
Int. Cl. C03b 9/12
U.S. Cl. 65—159
5 Claims

ABSTRACT OF THE DISCLOSURE

In a glass bulb manufacturing machine wherein a plurality of parisons are formed to depend from a continuously moving ribbon shaped glass blank and the parisons are moulded into products of predetermined configuration, a mould operating mechanism is provided which holds moulds in closed state along a predetermined path of movement of the parisons during normal operation of the machine but acts to hold the moulds in opened state during any desired period of the normal operation, for example, the starting period of the machine when the configuration of the parisons is not yet stable and may cause damage to the moulds. Each mould is divided into two halves removably mounted on mould operating members so that the time required for the replacement of the moulds can be minimized.

---

This application is a continuation-in-part application of Ser. No. 37,389, filed May 11, 1970 which is a streamlined application of Ser, No. 640,861, filed May 24, 1967, both of which are now abandoned.

This invention relates to a continuous glass bulb blowing machine and more particularly to a mould operating mechanism of the so-called ribbon machine wherein a stream of glass flowing down through an orifice at the bottom of a glass melting furnace is pressed into a ribbon shaped blank, and while the blank is conveyed longitudinally of the machine, blowing heads and moulds are caused to engage the glass blank from both sides thereof thereby to contiuously blow bulbs, bottles and the like glass wares.

In the ribbon machine of the type referred to above, each of the moulds is carried by one chain link of an endless mould conveyor chain driven in a vertical plane so as to be closed, rotated and opened during the upper horizontal run, thus determining the outer configuration of the bulbs and the like when they are blown.

However, during an interval from the starting of the ribbon machine to an instant somewhat later, the configuration of the parisons that hang down from the ribbon shaped glass blank through perforations of a plate conveyor adapted to carry the blank is not stable, so that when the moulds are closed during said period in the same manner as in the normal operation of the blowing machine, the following problems result because of the above described unstable configuration of the parisons.

More particularly, during the period in which the configuration of the parisons depending from the glass blank is not stable, a portion of the parisons may become jammed between the closed mould halves, which causes excessive force to be applied upon the mould operating mechanism, thus obstructing the operation thereof. Further, parisons of unstable configuration may apply an excessive force to portions of the internal surface of the mould, thus causing damage of the mould lining or paste layer as well as shortening of the operating life of the mould.

Further, where the blowing machine is to be used for maufacturing bulbs or bottles of different types, it is necessary to change the mould from one type to another. However, in the conventional mould operation mechanism, such change of moulds is not always easy and requires much time. Consequently, it is necessary to stop the operation of the bulb manufacturing machine for a long time, thus decreasing the actual working time and production efficiency.

Accordingly, it is an object of this invention to provide a novel mould operating mechanism of a ribbon type glass bulb manufacturing machine capable of operating the machine with its moulds held in the opened state during any desired period of its operation such as the starting period.

Another object of this invention is to provide a mould operating mechanism permitting easy and rapid replacement of the mould.

A conventional ribbon type glass bulb manufacturing machine to which the novel mould operating mechanism is applicable comprises means to form a ribbon shaped glass blank, a first endless conveyor to convey the glass blank along a predetermined path, a plurality of blowing heads to successively form parisons depending from the glass blank, a second endless conveyor mounted above the predetermined path in parallel with the first conveyor, a third endless conveyor mounted beneath the predetermined path in parallel with the first endless conveyor, and a plurality of moulds carried by the third endless conveyor to mould said parisons into products of predetermined configurations. The mould operating mechanism embodying this invention comprises means to open and close the moulds, means to rotate the moulds while they are closed, means to hold the moulds in closed state while they are conveyed along said predetermined path during normal operation of the glass bulb manufacturing machine, and means to hold said moulds in opened state while they are conveyed along the predetermined path.

More particularly, the mould operating mechanism comprises a hollow shaft carried by a link of the third endless conveyor, a pinion shaft extending through the hollow shaft, a pinion mounted on the pinion shaft and adapted to engage a stationary rack parallel with said predetermined path, said pinion being urged against a first ratchet wheel secured to the pinion shaft through a first friction disc, a second ratchet wheel secured to said hollow shaft and adapted to engage said pinion through a second friction disc, a first arm normally held out of engagement with the first ratchet wheel, a second arm normally held in engagement with the second ratchet wheel, mould operating members mounted on the top of the hollow shaft to be free to slide in the radial direction, said mould operating members being operated toward and away from each other by relative rotational movement between said hollow shaft and said pinion shaft, and first and second elongated cams arranged in parallel with the predetermined line, said first and second cams cooperating with the first and second arms to arrest and release the first and second ratchet wheels, said first cam being arranged to move between a first position in which the operating surfaces of the first and second cams are aligned in an operative plane and a second position in which the operating surface of the first cam is retracted from the operative plane to release the first ratchet wheel. A cam adjusting mechanism is mounted on the frame of the conveyor for moving the first elongated cam between its advanced and retracted positions.

Other objects and advantages of the invention together with the organization and operation thereof can be more fully understood from the following detailed description taken in connection with the accompanying drawings, in which:

FIG. 1 is a schematic side elevation view of a glass bulb blowing machine utilizing the novel mould operating mechanism embodying this invention;

FIG. 2 is a top plan view of one embodiment of this invention;

FIG. 3 is a side view, partly in section, of the embodiment shown in FIG. 2;

FIG. 4 is an enlarged sectional view of a portion of the embodiment shown in FIG. 2;

FIGS. 5A and 5B are diagrammatic plan views to explain the operation of the mould operating mechanism of this invention;

FIGS. 6A and 6B are enlarged views of essential portions of the mechanism;

FIG. 7 is a bottom view of the novel mould operating mechanism;

FIG. 8 is a side view of a brake device;

FIG. 9 is a perspective view of the mould operating member; and

FIG. 10 is a perspective view to show the manner of mouting a mould.

With reference to FIG. 1 of the accompanying drawing there is shown a side elevation of a so-called ribbon machine employing a mould operating mechanism embodying this invention. A horizontal swinging bed 2 is provided to swing about a pivot 1 and is arranged to be fixed at any position within its range of pivotal movement. The bed 2 is adapted to support a bed plate 4 of a blowing machine by means of rails 3 provided on the surface of the bed 2. Bed plate 4 is provided with a plurality of wheels 5 that ride on rails 3. The wheels are adjustable in the vertical direction by means of adjusting screws 6.

Bed plate 4 supports feed rollers 7 mounted at the left hand end and function to press a glass stream supplied from an orifice at the bottom of a glass melting furnace (not shown) into a ribbon shaped blank and then supply it to a blowing machine, a plate conveyor (not shown) driven by an electric motor 8 through a transmission mechanism 9 and a drive 10, a blow head carrying chain conveyor (not shown) also driven by transmission mechanism 11 and disposed above the path of travel 12 of said plate conveyor, and a mould carrying chain conveyor driven by transmission mechanism 9 through a driving mechanism 13 and is arranged to move along a guide 14 positioned below said plate conveyor.

The plate conveyor, not shown, functions to receive the ribbon shaped glass blank from feed rollers 7 to convey it in the longitudinal direction of the machine. During this transfer, blow heads carried by the blow head carrying chain conveyor, and moulds carried by the mould carrying conveyor are successively brought into engagement with the blank to blow and mould bulbs.

This invention contemplates the provision of a novel mould operating mechanism suitable for use in such a ribbon machine.

Referring now to FIG. 2 which illustrates a link unit of the mould carrying chain conveyor, a plurality of shafts 16, each carrying chain rollers 15 at its opposite ends, are journalled at the opposite edges of links 17 which are interconnected to form the chain conveyor.

A hollow shaft 18 is provided to extend through link 17, and a pinion shaft 19 is arranged to extend through the interior of hollow shaft 18. There are provided a ratchet wheel 20 secured to the pinion shaft 19, a friction disc 21 freely mounted on shaft 19, a pinion 22 freely mounted on shaft 19 and adapted to mesh a stationary rack 35 provided on the bed plate 4, and a second friction disc 23, said components 20–23 being stacked around shaft 19 in the order of reference numerals. A ratchet wheel 24 adapted to rotate the hollow shaft 18 is secured to the lower end thereof and a disc 24a secured to the lower surface of ratchet wheel 24 is urged against friction disc 23.

As best shown in FIG. 4, the upper end of the hollow shaft 18 is formed with an enlarged portion in which a pinion 25 is secured to the upper end of pinion shaft 19. Pinion 25 meshes diametrically opposite pinions 26, the upper end of the shafts thereof carrying pinions 29 meshing with racks 28. Racks 28 are juxtaposed to be longitudinally slidable with respect to each other and are secured to the lower portions of mould operating members 27.

As shown in FIGS. 3 and 7, on one side of said link 17, there is provided a shaft 30 rotatably carrying arms 31 and 32, respectively including pawls which cooperate with said ratchet wheels 20 and 24, respectively, opposite ends of arms 31 and 32 being provided with rollers 33 and 34 cooperating with plate cams 36 and 37 on the bed plate 4 in a manner to be described later.

The relation between said arms 31, 32, plate cams 36, 37, pinion 22 and the stationary rack 35 is shown in FIGS. 5A, 5B and FIGS. 6A and 6B.

As shown in FIGS. 3, 5A and 5B, the stationary rack 35 is provided along one longitudinal edge of bed plate 4, and plate cams 36 and 37 are provided along the other longitudinal edge to cooperate with rollers 33 and 34 respectively carried by arms 31 and 32. The plate cam 36 has a stationary end portion 36A aligned with plate cam 37, the remaining portions thereof being horizontally shiftable in the direction normal to the longitudinal axis of the bed plate 4. In particular, as clearly illustrated in FIG. 3, the horizontally movable plate cam 36 is slidably supported on a guide block 50 which is mounted on the conveyor frame portion of the bed 4. The plate cam 36 slides toward and away from the roller 33, on the block 50, under the control of an adjusting mechanism including a handwheel 51; a worm gear 52 connected to the handwheel for rotation therewith and rotationally mounted to the bed 4; a worm wheel 53 disposed to mesh with the worm gear 52; an internally threaded sleeve 54 fixed to said worm wheel in axial alignment therewith and received for rotation in a bore provided in the bed 4; and an axially movable shaft 55 having one end fixed to the slideable cam 36, and having a threaded intermediate portion disposed in mesh with the internal threads of the rotatable sleeve. Thus, upon rotation in alternate directions of the handwheel 51 and resultant rotation of the worm gear 52, worm wheel 53 and sleeve 54, the shaft 55 and cam 36 are caused to advance and retract toward the roller 33. FIG. 5A shows the condition in which plate cam 36 is slightly retracted from plate cam 37 while FIG. 5B shows the condition in which plate cam 36 is advanced to align with plate cam 37. FIG. 6A shows relative operating positions of plate cams 36 and 37, arms 31 and 32, pawls carried thereby, and racks 35 during normal operation while FIG. 6B shows the positions of these members during a period wherein it is necessary to maintain the mould in the opened state, such as during the starting period.

FIG. 7 shows the detail and mutual relation of respective ratchet wheels and arms associated therewith, and FIG. 8 shows a brake mechanism adapted to prevent a mould from opening due to the centrifugal force during rotation of the mould. More particularly, FIG. 7 is a view showing the ratchet wheels as viewed from below in FIG. 3. Arms 31 and 32 are biased by means of springs 40b (only one being shown in FIG. 7) to urge a pawl provided at the outer end of arm 32 against the outer periphery of ratchet wheel 24 and to disengage a pawl on the outer end of arm 31 from ratchet wheel 20, as shown by solid lines in FIG. 7. Ratchet wheels 20 and 24 are provided with notches 20a and 24a to receive pawls of arms 31 and 32.

The brake mechanism shown in FIG. 8 includes a brake shoe 38 cooperating with the outer periphery of hollow shaft 18 and a bellcrank arm 39 biased in the counterclockwise direction by a spring 39a as viewed in FIG. 2.

FIGS. 9 and 10 show a mould operating member and a manner of mounting mould halves thereon. Thus, on the upper surface of the mould operating member 27 there are provided T-shaped ribs 27a to receive T-shaped grooves 40a at the lower surface of the mould half 40, which is held in position by dowel pins 41. As shown in FIG. 10, pawls 42 are provided to depress dowel pins 41.

The operation of the operating mechanism embodying this invention is as follows:

When it is intended to operate the ribbon machine without closing, the mould as in the starting period of the blowing machine, plate cam 36 is advanced by the manually operated screw drive illustrated in FIG. 3, to the position shown in FIGS. 5B and 6B, to align with cam plate 37. In this position, as the novel mechanism carried by the mould carrying chain conveyor is advanced to the section of the machine provided with stationary rack 35 as shown in FIG. 6B, pinion 22 will commence to rotate as the chain advances. However, as both arms 31 and 32 are in engagement with cam plates 36 and 37, the pawl carried by arm 31 will be rotated to engage the outer periphery of ratchet wheel 20 against the force of biasing spring 40b, whereas the pawl carried by arm 32 will be rotated to disengage from ratchet wheel 24. Under these conditions, the rotation of pinion 22 caused by the engagement thereof with rack 35 is transmitted to hollow shaft 18 through friction disc 23 to rotate only hollow shaft 18. This will cause pinion shaft 19 to rotate with respect to hollow shaft 18, thus resulting in the relative sliding motion of racks 28 in their longitudinal direction. Consequently, mould operating members 27 are held in an opened state, and the moulds carried thereon are conveyed in the longitudinal direction of the blowing machine while they are opened. When this portion of the chain link is moved toward the right as viewed in FIG. 6B to reach a position at which arms 31 and 32 disengage from plate cams 36 and 37, pinion 22 also disengages from rack 35 to stop the rotation of the mould operating mechanism. At this time the pawl of arm 32 will come to engage ratchet wheel 24 under the action of the biasing spring 40b, while arm 31 will be disengaged from ratchet wheel 20. Under these conditions, the chain link carrying the mould operating mechanism enters the bottom horizontal run with the moulds in an open state.

After completion of the starting period, the novel mechanism operates in the following manner during normal operation.

At this time, plate cam 36 is maintained in its retracted position shown in FIG. 5A. Again, pinion 22 commences to rotate when the chain link enters the section provided with rack 35. As the plate cam 36 is held in its retracted position the arm 31 is disengaged from ratchet wheel 20 when the mechanism enters into the section provided with rack 35. As a result, the rotation of pinion 22 is transmitted to shaft 19 through friction disc 21. Accordingly, the relative rotation between shaft 19 and hollow shaft 18 is reversed from that of the case shown in FIGS. 5B and 6B, thus causing pinion 25 to drive pinions 26 to drive racks 28, and thus closing the moulds through operating members 27.

As the chain link advances further, plate cam 37 operates to rotate arm 32 away from ratchet wheel 24 against the force of spring 40b. Then hollow shaft 18 will be rotated through friction disc 23 to rotate mould operating members 27 and, hence, the closed mould carried thereby.

When the chain link carrying mould operating mechanism which is low in a closed and rotating state reaches the trailing end sections of plate cams 36 and 37, stationary plate cam 36a which is positioned ahead of plate cam 36 operates to cause arm 31 to engage ratchet wheel 24 to stop rotation of shaft 19, leaving hollow shaft 18 alone rotating. Consequently, the rotation of pinions 26 and 29 relative to pinion 25 is reversed, and at the same time racks 28 are also driven in the direction opposite to that described above to open operating members 27 and the moulds supported thereby.

Thereafter arm 32 is caused to engage ratchet wheel 24 by the action of the spring associated therewith, but, at this time, as the operating mechanism leaves the region provided with rack 35, the chain link enters into the lower horizontal run while carrying the opened non-rotating mould operating mechanism.

While not particularly described, it is to be understood that the blowing operation of one bulb is completed while the moulds are operated through one cycle of closing rotating opening. Further, the blowing machine may be used to manufacture bottles and the like glass wares other than electric bulbs and tubes.

From the foregoing description it will be clear that this invention provides a novel mould operating mechanism which permits moulds to advance in closed or opened state. Thus, during the starting period of the glass bulb blowing machine wherein the configuration of the parison is not yet stable, the moulds are conveyed in the opened state or without effecting moulding operation, so that the above described difficulties of damaging the mould operating mechanism as well as the mould release layer in the moulds, are overcome. Moreover, replacement of moulds for different types of products can be made readily and promptly, thus decreasing loss of operating time.

What we claim is:

1. In a glass bulb manufacturing machine including means to convey a ribbon shaped glass blank, means to successively form parisons in said glass blank, a plurality of moulds formed in halves and adapted to mould said parisons, and conveyor means synchronously driven with said glass blank to convey said moulds along a predetermined path, wherein the improvement comprises a mould operating mechanism for opening, closing and rotating a mould, said mould operating mechanism including a tubular shaft carried by said conveyor means; and internal shaft extending coaxially through said tubular shaft and projecting outwardly therefrom; first and second ratchet means fixedly mounted respectively to said tubular and internal shafts; a pinion rotatably mounted on one of said shafts; rack means mounted on said machine for rotating said pinion as said tubular shaft is moved with said conveyor means; friction means releasably interconnecting said pinion to said first and second ratchet means; first and second cam arms each having a cam follower surface thereon, said cam arms being pivotally mounted on said conveyor means for movement into engagement with said respective ratchet means for preventing rotation of said respective ratchet means; first and second cams mounted on said machine for selectively pivoting said cam arms as said arms are moved with said conveyor means; adjusting means coupled to at least one of said first and second cams for selectively advancing and retracting said at least one cam in a direction perpendicular to the path of travel of said conveyor means, said adjusting means including a rod having a threaded portion, said rod being connected to said one cam for axial displacement to cause said advancing and retracting movement of said one cam, and rotatable gear means connected to said machine and having a threaded portion disposed in mesh with said threaded portion of said rod, and means supporting said rod for said axial displacement in response to rotation of said gear means; a pair of mould halves; means for removably coupling said pair of mould halves to said shafts; means coupled to said shafts for opening and closing the mould halves in response to relative rotation of said shafts; and means coupled to said shafts for rotating the mould halves in response to rotation of one of said shafts.

2. A glass bub manufacturing machine as set forth in claim 1, in which said first cam arm is engageable with said first ratchet to prevent movement of said tubular shaft, and in which said means coupled to said shaft for opening and closing the mould halves cause said mould halves to close under rotation of said internal shaft.

3. A glass bulb manufacturing machine as set forth in claim 1, in which said second cam arm is engageable with said second ratchet to prevent movement of said internal shaft, and in which said means coupled to said shaft for opening and closing the mould halves cause said mould halves to open under rotation of said tubular shaft.

4. A glass bulb manufacturing machine as set forth in claim 3, in which the mould halves are rotated together under rotation of said tubular shaft.

5. A glass bulb manufacturing machine as set forth in claim 1, in which said threaded portion of said adjusting means rod comprises external threads on said rod, and said gear means comprises an internally threaded sleeve rotatably connected to said machine, said rod being received with said sleeve, a worm wheel fixed to said sleeve, a worm gear rotatably connected to said machine and disposed in mesh with said worm wheel, and means for rotating said worm gear.

References Cited
UNITED STATES PATENTS 1,790,397   1/1931   Woods et al. _____ 65—184 X

FOREIGN PATENTS 701,672   12/1953   Great Britain.

ARTHUR D. KELLOGG, Primary Examiner

U.S. Cl. X.R.

65—185, 313, 359